United States Patent
Cantor et al.

(10) Patent No.: US 11,138,791 B2
(45) Date of Patent: Oct. 5, 2021

(54) VOXEL TO VOLUMETRIC RELATIONSHIP

(71) Applicant: Intuitive Research and Technology Corporation, Huntsville, AL (US)

(72) Inventors: Chanler Crowe Cantor, Madison, AL (US); Michael Jones, Athens, AL (US); Kyle Russell, Huntsville, AL (US); Michael Yohe, Meridianville, AL (US)

(73) Assignee: Intuitive Research and Technology Corporation, Huntsville, AL (US)

( * ) Notice: Subject to any disclaimer, the term of this patent is extended or adjusted under 35 U.S.C. 154(b) by 0 days.

(21) Appl. No.: 16/812,574

(22) Filed: Mar. 9, 2020

(65) Prior Publication Data

US 2020/0211282 A1 Jul. 2, 2020

Related U.S. Application Data

(63) Continuation-in-part of application No. 16/703,012, filed on Dec. 4, 2019, and a continuation-in-part of application No. 16/428,372, filed on May 31, 2019.

(60) Provisional application No. 62/815,588, filed on Mar. 8, 2019, provisional application No. 62/774,965, filed on Dec. 4, 2018, provisional application No. 62/774,960, filed on Dec. 4, 2018.

(51) Int. Cl.
*G06T 17/20* (2006.01)
*G06T 7/529* (2017.01)
*G06T 19/20* (2011.01)

(52) U.S. Cl.
CPC ............ *G06T 17/205* (2013.01); *G06T 7/529* (2017.01); *G06T 19/20* (2013.01); *G06T 2200/24* (2013.01); *G06T 2210/22* (2013.01)

(58) Field of Classification Search
CPC ...................................................... G06T 17/20
See application file for complete search history.

(56) References Cited

U.S. PATENT DOCUMENTS

| | | | |
|---|---|---|---|
| 5,745,197 A * | 4/1998 | Leung | H04N 13/395 349/77 |
| 2004/0070582 A1* | 4/2004 | Smith | A61B 8/4254 345/419 |
| 2009/0112095 A1* | 4/2009 | Daigle | A61B 8/06 600/454 |
| 2015/0087979 A1* | 3/2015 | Zhang | A61B 8/4209 600/440 |
| 2017/0119355 A1* | 5/2017 | Pintoffl | A61B 8/54 |
| 2017/0263023 A1* | 9/2017 | Zhou | G06T 19/00 |
| 2018/0218535 A1* | 8/2018 | Ceylan | G06T 1/0007 |
| 2018/0279996 A1* | 10/2018 | Cox | A61B 8/488 |

* cited by examiner

*Primary Examiner* — Phi Hoang
(74) *Attorney, Agent, or Firm* — Angela Holt; Frank M. Caprio; Bradley Arant Boult Cummings LLP

(57) ABSTRACT

A computer-implemented method that allows users to upload a set of two-dimensional images for evaluation using different virtual reality methods. The disclosed method allows the user to select one aspect of an image, see the corresponding image highlighted, and manipulate the corresponding image.

11 Claims, 7 Drawing Sheets

VOXEL TO VOLUMETRIC RELATIONSHIP

REFERENCE TO RELATED APPLICATIONS

This application claims priority to Provisional Patent Application U.S. Ser. No. 62/815,588, entitled "Voxel to Volumetric Relationship" and filed on Mar. 8, 2019, which is fully incorporated herein by reference. This application further is a continuation-in-part of, and claims priority to, U.S. non-provisional patent application Ser. No. 16/703,012 entitled "Rastered Volume Renderer and Manipulator" and filed on Dec. 4, 2019, which claimed priority to U.S. Provisional Patent Application No. 62/774,965, filed on Dec. 4, 2018. This application further is a continuation-in-part of, and claims priority to, U.S. non-provisional patent Ser. No. 16/428,372 entitled Voxel Build and filed on May 31, 2019, which claimed priority to U.S. Provisional Patent Application U.S. Ser. No. 62/774,960 filed on Dec. 4, 2018. These applications are fully incorporated herein by reference.

BACKGROUND AND SUMMARY

The method disclosed herein relates to an image-generation method for three-dimensional images. In this context, a voxel is to be understood to mean a volume element in the three-dimensional examination zone and a pixel is an image element of the two-dimensional image. A voxel image value is assigned a numerical value that characterizes a physical quantity in the relevant voxel.

Currently, there are a limited number of methods used to visualize and display scanned data. Usually these methods use a combination of software packages to evaluate the data set. One current method is to view the scans in software and then exporting to create a three-dimensional image or three-dimensional printed model. Most current methods involve scrolling through the scans one by one or for health professionals (for example) to clean the data. These methods are time consuming and expensive, and they create data sets that are static and not manipulatable.

The conventional approach involves the following two different methods: three-dimensional printing and evaluating scan data on a computer. For three-dimensional printing, the user performs various conversions of the scan data, loads scan data into software, exports a rough three-dimensional mesh file that can be printed, imports the rough three-dimensional mesh file into a three-dimensional modeling software for polishing, exports the polished model to a file, and prints the model.

Currently, users use scan data on a computer. In the most advanced method, a user evaluates scan data on a computer, scrolls through the scan images, uses a software package to load the scans and turn them into a three-dimensional mesh, the software renders the mesh onto a two-dimensional screen, and user can rotate the mesh around a pre-selected axis. Some users may make a three-dimensional mesh out of the scans; however, these are rudimentary and time-consuming.

What is needed is a method that allows scans to be manipulated, allows for viewing in multiple ways, shows relationships between multiple meshes, can be adjusted to show different densities, and can isolate aspects of the mesh.

The current method improves upon existing methods to build up voxels and to create volumetric three-dimensional data, such as using two-dimensional images loaded into a three-dimensional mesh generating program. The mesh generating program creates a three-dimensional mesh based on two-dimensional images input into the program and the user described predetermined threshold value. Once the mesh is generated, the user can load the mesh into virtual space for evaluation. However, this process can be time consuming and often necessitates repetition before yielding desired results, because it is not done at runtime.

Under the described method, users (in on example, medical professionals evaluating medical images) can easily see a set of correlated two-dimensional and three-dimensional images to evaluate their densities and search for abnormalities in three-dimensional space. The described method takes in a series of two-dimensional images and utilizes multiple methods to generate manipulatable images. The method translates the two-dimensional images into image textures, which are spawned into planar meshes for user evaluation. The method creates voxel mesh by evaluating every pixel based on the user described or predetermined threshold value at runtime. If the program meets the user described predetermined thresholds for a pixel, the pixel is flagged. Once every pixel is evaluated, the system reads the locations of the flagged pixels and maps them in three-dimensional space. For each location, a small mesh, or voxel, is created, which represents the flagged pixel. Once all the voxels are created, the user may manipulate the set of voxels as if they are one mesh. And the method creates volumetric mesh by converting the images into three-dimensional image mesh using the method disclosed in U.S. non-provisional patent application Ser. No. 16/703,012, referenced herein.

Under the disclosed method, once the voxel data and volumetric data are created, the user may compare them side by side. The disclosed method also allows the user to select one and see the relational location on the other.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

In some embodiments of the present disclosure, the operator may use the described method to create a three-dimensional mesh from two-dimensional data. As used herein, the term "XR" is used to describe Virtual Reality, Augmented Reality, or Mixed Reality displays and associated software-based environments. As used herein, "mesh" is used to describe a three-dimensional object in a virtual world, including, but not limited to, systems, assemblies, subassemblies, cabling, piping, landscapes, avatars, molecules, proteins, ligands, or chemical compounds. As used herein, "voxel" is used to describe a value on a regular grid in three-dimensional space. The position of the voxel is determined by the software by the location of the pixels over a user-determined threshold.

Figure 1:
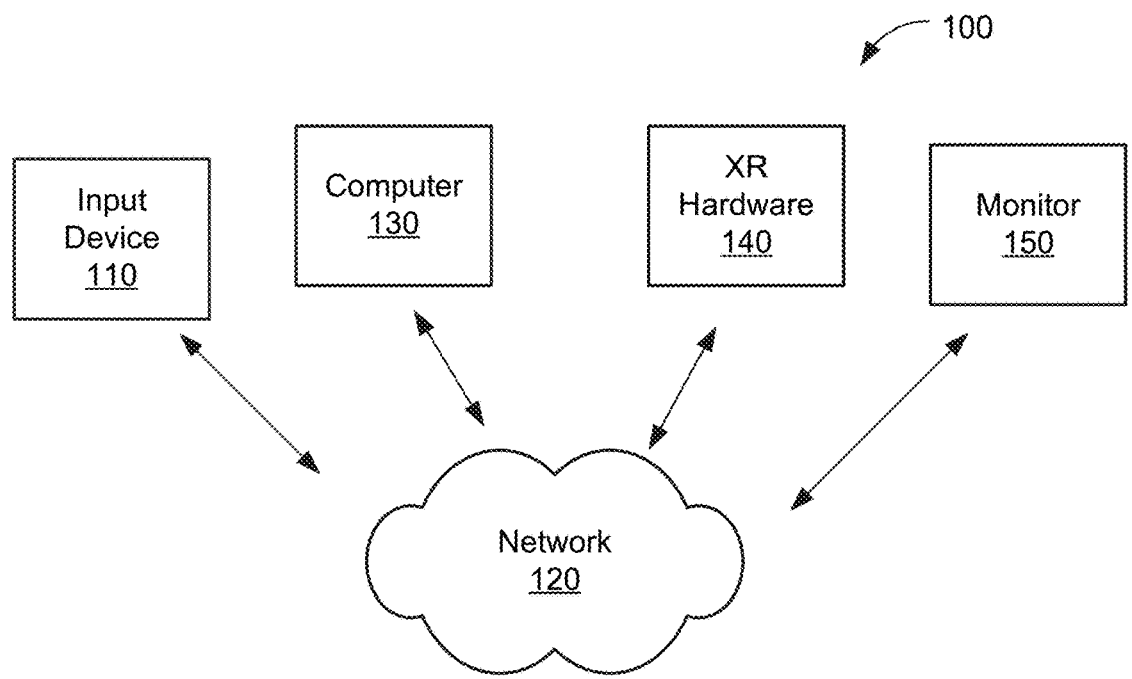
FIG. 1 depicts a system for supporting two-dimensional to three-dimensional spatial mapping, according to an exemplary embodiment of the present disclosure.

FIG. 1 depicts a system 100 for supporting two-dimensional to three-dimensional spatial mapping (not shown), according to an exemplary embodiment of the present disclosure. The system 100 comprises an input device 110 communicating across a network 120 to a computer 130. The input device 110 may comprise, for example, a keyboard, a switch, a mouse, a joystick, a touch pad and/or other type of interface, which can be used to input data from a user (not shown) of the system 100. The network 120 may be a combination of hardware, software, or both. The system 100 further comprises XR hardware 140, which may be virtual or mixed reality hardware that can be used to visualize a three-dimensional world. The system 100 further comprises a video monitor 150 is used to display the three-dimensional data to the user. In operation of the system 100, the input device 110 receives input from the computer 130 and translates that input into an XR event or function call. The input device 110 allows a user to input data to the system 100, by translating user commands into computer commands.

Figure 2:
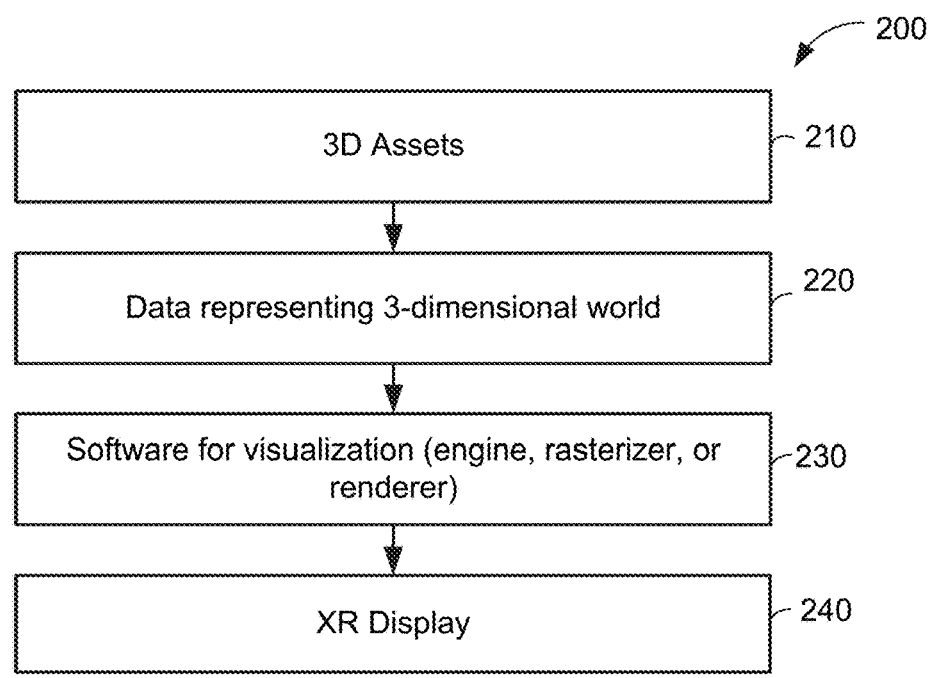
FIG. 2 depicts a method for converting data into three-dimensional data capable of XR display according to an exemplary embodiment of the present disclosure.

FIG. 2 depicts a method 200 for converting data into three-dimensional data capable of XR display according to an exemplary embodiment of the present disclosure. In step 210, a user selects a three-dimensional object in a three-dimensional plane. To select the three-dimensional object, the user uses an input device 110 (FIG. 1), for example, a computer mouse. In step 220, the software represents data into XR compatible three-dimensional data. In step 230, the software for visualization allows the three-dimensional data to be represented in an XR display 240. This is true regardless of any manipulation performed on the three-dimensional object.

Figure 3:
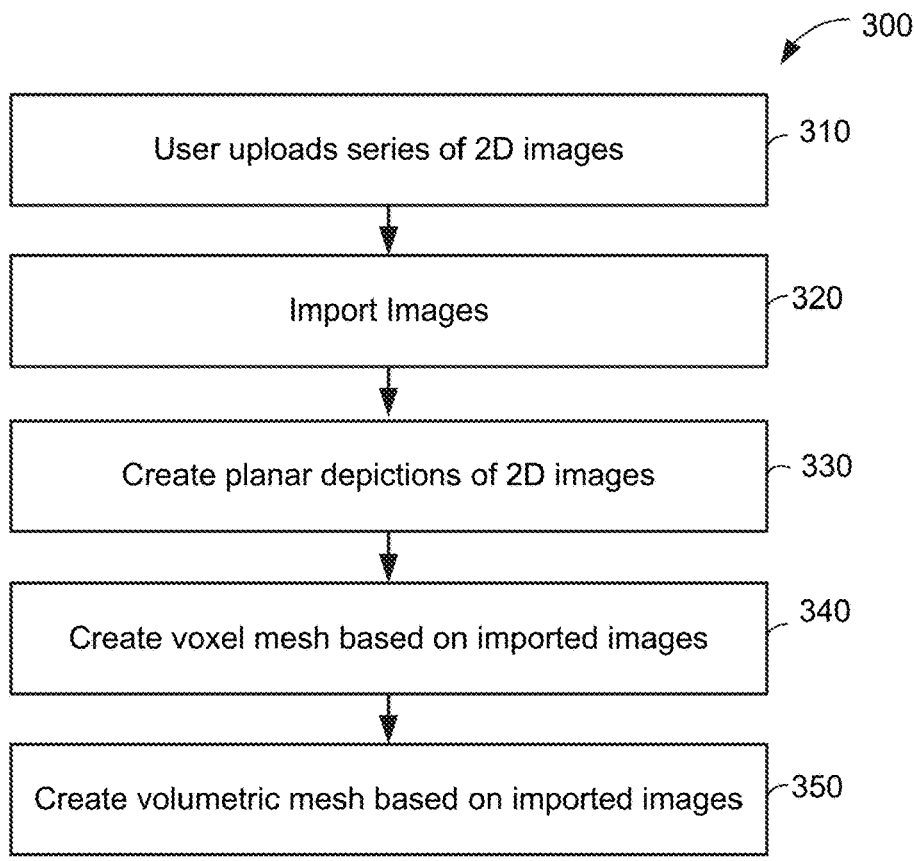
FIG. 3 is a flow diagram depicting the data importation and asset creation process performed by the software.

FIG. 3 depicts a method 300 for importing data and using the imported data to create assets. In step 310, the user uploads a series of two-dimensional images for evaluation. This can be done through a graphical user interface, copying the files into a designated folder, or another upload method. The software imports the two-dimensional images in step 320. The software creates planar depictions of the two-dimensional images in step 330. The planar depictions are in the form of a card deck in one embodiment. In step 340, the software creates the voxel mesh based on the two-dimensional images. In step 350, the software then creates the volumetric mesh based on the two-dimensional images.

Figure 4:
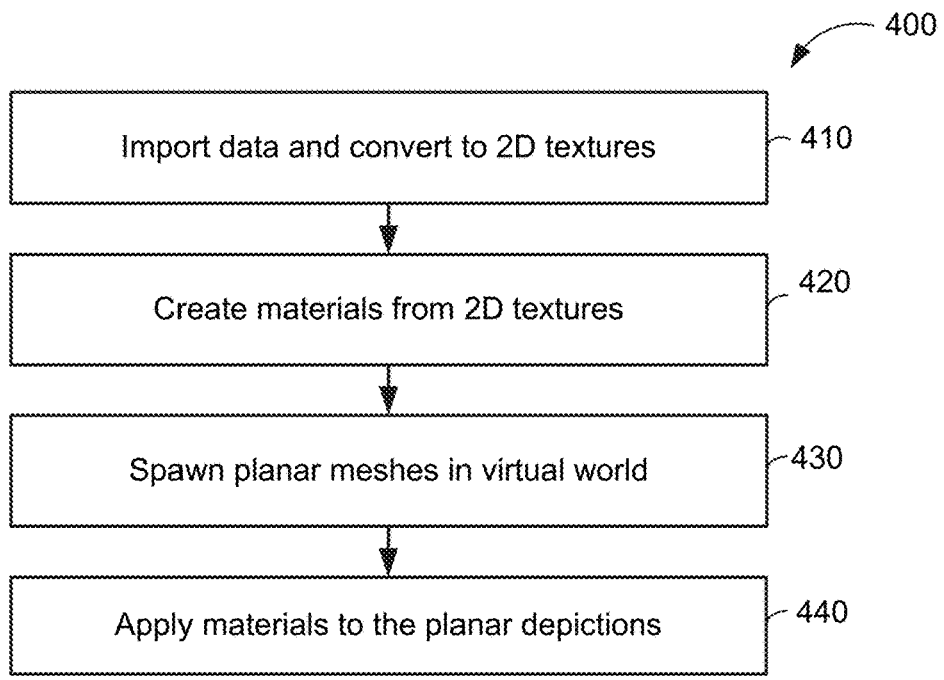
FIG. 4 is a flow diagram depicting the creation of the planar mesh from two-dimensional images.

FIG. 4 depicts a method 400 of creating a planar representation of the uploaded series of images. In step 410, the system imports image data and converts the image data into two-dimensional textures, which allows the user to manipulate the images. In step 420, the software creates a material instance for each of the two-dimensional textures using two-dimensional texture as a color. Each material instance corresponds to one of the imported two-dimensional textures. In step 430, the software spawns a planar mesh for each of the material instances or textures, which are placed in the virtual space and are visible to the user. In step 440, the software assigns a different material instance to each planar mesh in order, and the resulting images are also represented in order, which is important for scan-derived data.

Figure 5:
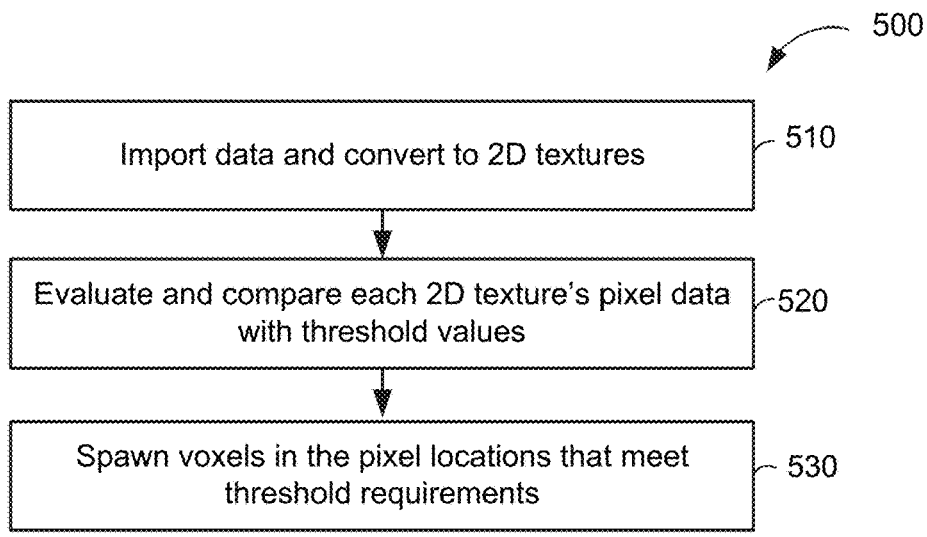
FIG. 5 is a visual diagram depicting the process of creating the voxel creation from two-dimensional images.

FIG. 5 depicts a method 500 of creating the voxel representation of the uploaded series of images. In step 510, data is imported and image data is converted into two-dimensional textures, so the images can be manipulated by the software. In step 520, the system evaluates each voxel pixel and compares the pixel data with user- or software-driven thresholds. In step 530, the software then spawns voxels at each pixel location that meets threshold requirements.

Figure 6:
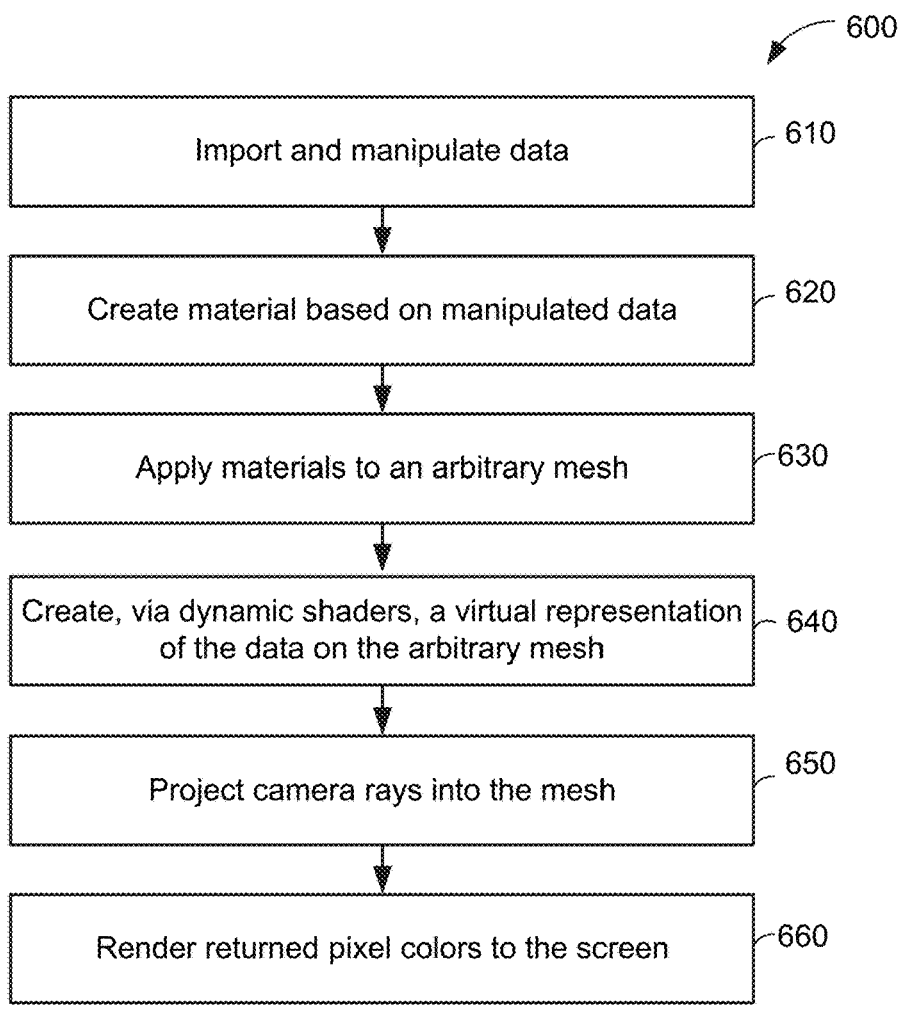
FIG. 6 is a visual diagram depicting the process of creating the volumetric mesh creation from two-dimensional images.

FIG. 6 depicts a method 600 of creating a volumetric mesh. In step 610 the system imports and converts the image data into two-dimensional textures, which can then be manipulated by the software. In step 620, the software performs manipulations of the imported two-dimensional textures, creating material that holds all the imported images. The software then volumetrically renders the imported textures into a mesh. In step 630, the software applies the master material to the mesh in the virtual world, which may be represented by an inside out cube. After the master material is applied to the mesh, the material is dynamically shaded to create volumetric versions of the images. In step 640, the software virtually slices the mesh volume into equal parts based on the user's desired resolution. In step 650, a virtual camera projects arbitrary rays into the mesh volume from the camera face, using the method disclosed in U.S. non-provisional patent application Ser. No. 16/703,012, referenced herein. In step 660, the software colors the pixels on the mesh and screen based on the returned results from the rays. The returned results of the rays are based on the tiled texture, which is used by the master material and hit by rays in virtual space. Each of the tiles has its own piece of the mesh. The software compares the images to determine rendering based on the rays that hit tiles.

Figure 7:
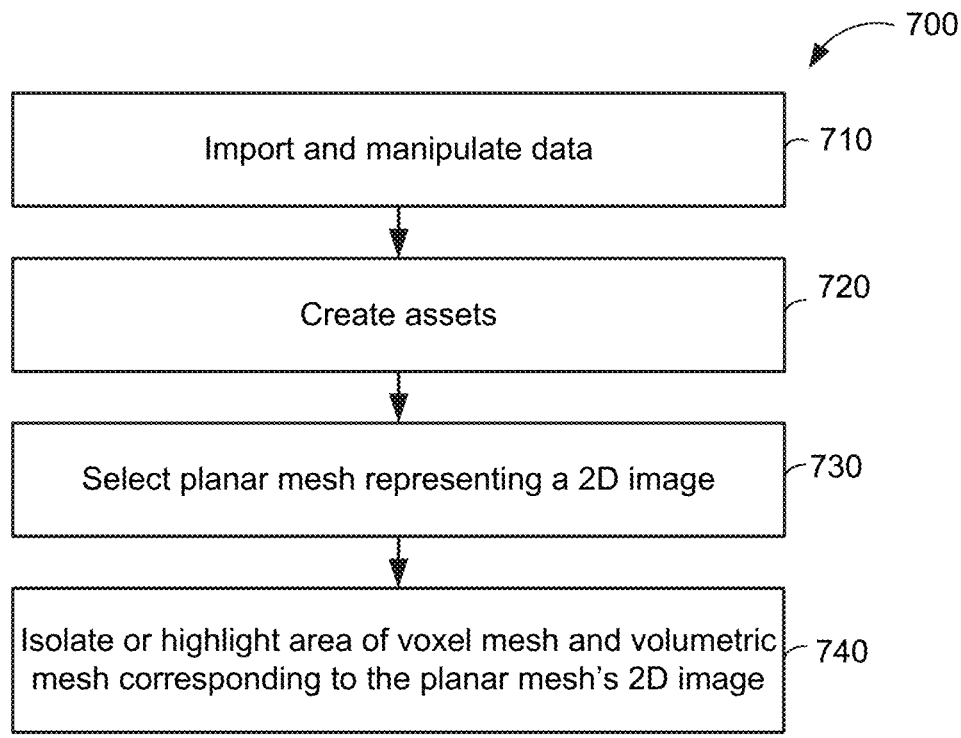
FIG. 7 is a visual diagram depicting the relationship between the planar depiction selection and mesh isolation.

FIG. 7 shows a method 700 for relating the planar depiction selection with mesh isolation. In step 710, the software imports two-dimensional images for conversion and manipulation. In step 720, the software uses the two-dimensional image to create assets, such as planar depictions, voxel mesh, and volumetric mesh (which are created using the methods of FIG. 4, FIG. 5, and FIG. 6, respectively). In step 730, the user selects one of the planar depictions. The software uses the mapping of the planar material and the array of two-dimensional textures to link the user-selected planar depiction to the array of two-dimensional textures. In step 740, the software associates the selected voxel and volumetric meshes with the two-dimensional images, and areas of the voxel and volumetric meshes associated with the selected two-dimensional image are highlighted or isolated based on user preference. (As used herein, the term "isolation" refers to the "cutting" of the mesh where only the area associated is displayed.)

Figure 8:
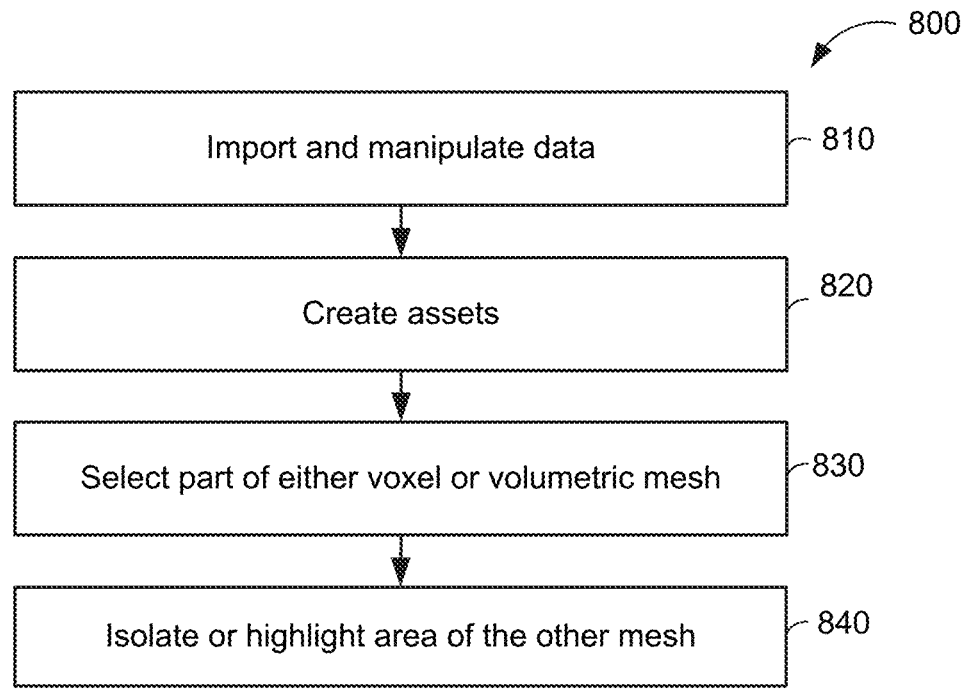
FIG. 8 is a visual diagram depicting the relationship between the voxel and volumetric meshes.

FIG. 8 shows a method 800 for relating voxel and volumetric mesh. In step 810, the user imports two-dimensional images. In step 820, the software converts and manipulates the images as needed to create meshes 820. In step 830, the user selects part of the mesh, which is highlighted or isolated based on user preference. In step 840, the area corresponding to the selected area is also highlighted or isolated on the other mesh. This is possible because both meshes are from the same set of images and their locations and dimensions are relative to each other.

Figure 9:
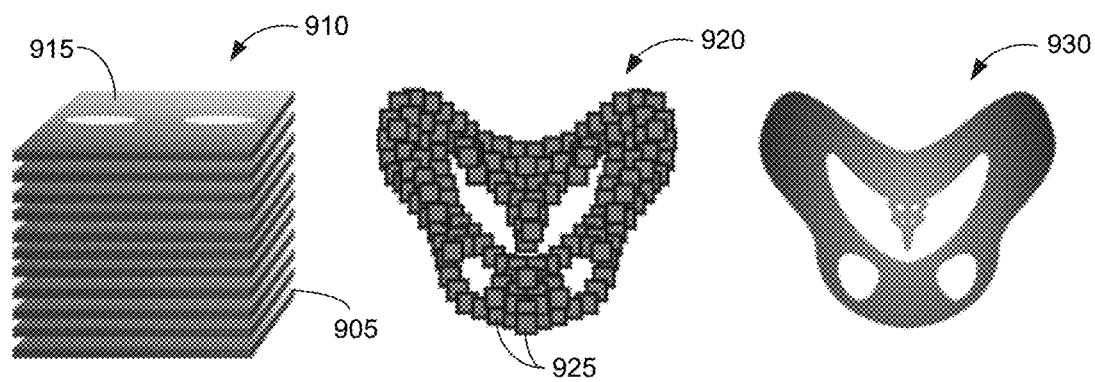
FIG. 9 is a pictorial depiction of the relationship between the voxel, volumetric mesh, and two-dimensional images.

FIG. 9 is an exemplary pictorial depiction of a planar depiction 910, a voxel mesh 920, and a volumetric mesh 930, all of an image of a human pelvis. All three of the planar depiction 910, voxel mesh 920, and volumetric mesh 930 were created from the same set of two-dimensional images. The planar depiction 910 was created using the method of FIG. 4. The planar depiction 910 of the uploaded two-dimensional images consist of one plane 905 per image, resulting in a stack 915 of planes.

The voxel mesh 920 was created using the method of FIG. 5. The voxel mesh 920 consists of pixels 925 (each square representing a pixel) representing the desired threshold requirements.

The volumetric mesh 930 was created using the method of FIG. 6. The volumetric mesh 930 is made up of the uploaded two-dimensional images.

Figure 10:
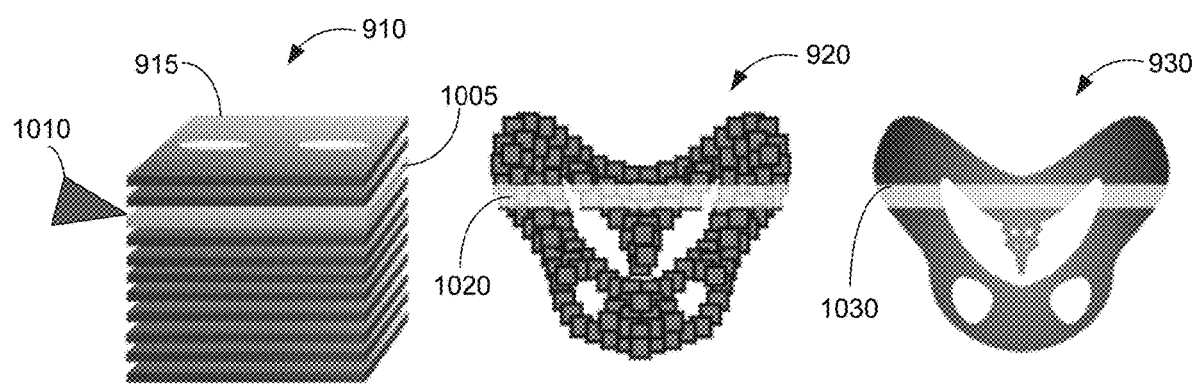
FIG. 10 is a pictorial depiction of the relationship between the voxel, volumetric mesh, and two-dimensional images when one is selected by a user.

FIG. 10 is a pictorial depiction of a user selection, with a user input tool 1010. The user input tool 1010 is depicted in the image as a triangle. The user selection of one plane 1005 of the image stack 915 highlights a corresponding portion 1020 of the voxel mesh 920 and a corresponding portion 1030 of the volumetric mesh 930.

Figure 11:
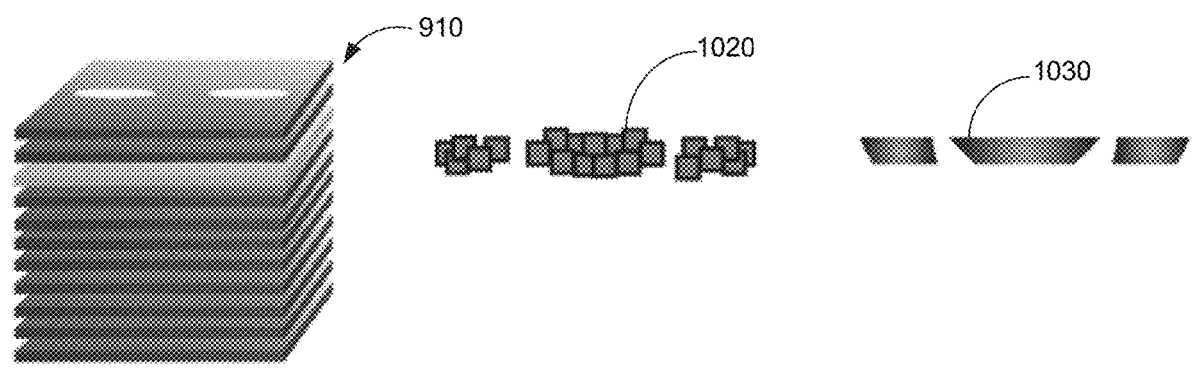
FIG. 11 is a pictorial depiction of the relationship between the voxel, volumetric mesh, and two-dimensional image selection

FIG. 11 is an alternative pictorial representation of the user selection of FIG. 10, with the selected portions 1020 of the voxel mesh 920 and 1030 of the volumetric mesh 930 isolated instead of highlighted.

Figure 12:
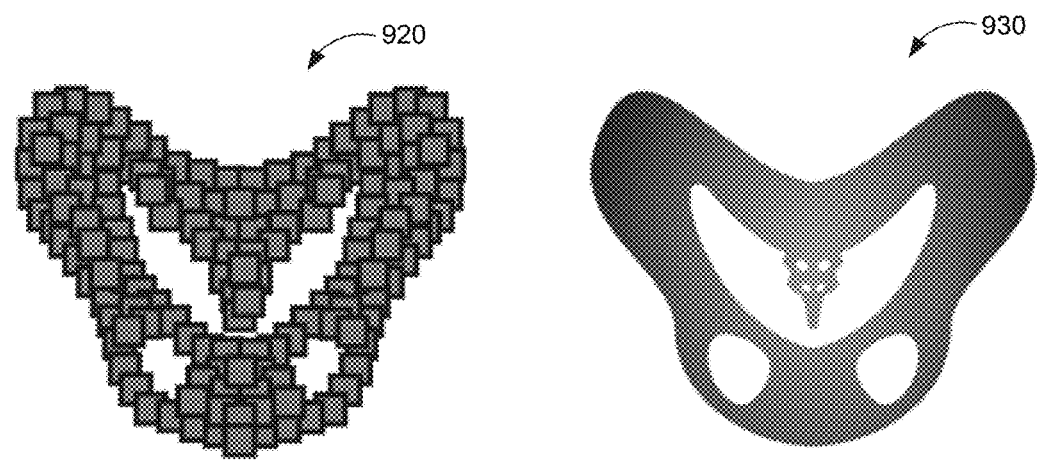
FIG. 12 is a pictorial depiction of the relationship between the voxel and volumetric mesh images.

FIG. 12 depicts a voxel mesh 920 displayed with an associated volumetric mesh 930. Unlike the display of FIG. 9, the planar depiction is not shown in this display.

Figure 13:
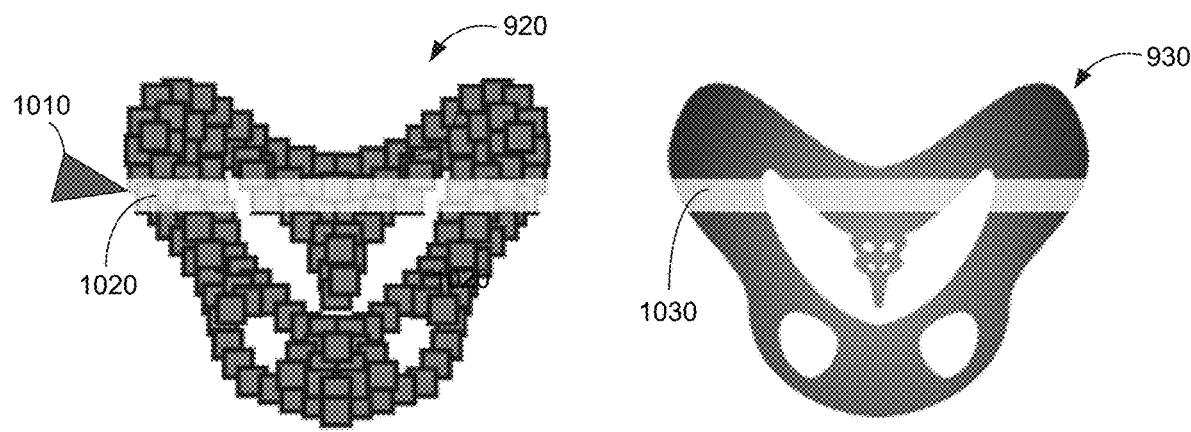
FIG. 13 is a pictorial depiction of the relationship between the voxel and volumetric mesh images when one is selected by the user.

FIG. 13 depicts a user selection, via the user input tool 1010, of a portion 1020 of the voxel mesh 920, and a highlighting of the corresponding portion 1030 of the volumetric mesh 930.

Figure 14:
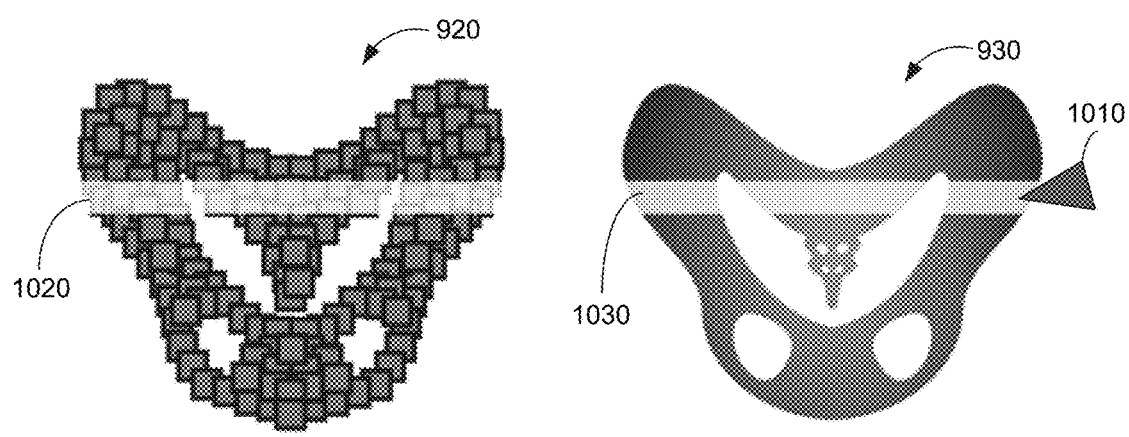
FIG. 14 is a pictorial depiction of the relationship between the voxel and volumetric mesh images when one is selected by the user, causing a corresponding highlight on the other image.

FIG. 14 depicts a user selection, via the user input tool 1010, of a portion 1030 of the volumetric mesh 930, and a highlighting of the corresponding portion 1020 of the voxel mesh 920.

What is claimed is:

1. A method for creating three-dimensional mesh capable of evaluation and manipulation, comprising:
    uploading two-dimensional images for evaluation;
    creating planar depictions of the two-dimensional images;
    creating a voxel mesh image by pixel based on the two-dimensional images;
    creating a volumetric mesh image based on the two-dimensional images;
    displaying the planar depictions, the voxel mesh image, and the volumetric mesh image to a user in a virtual space;
    relating the planar depictions with the voxel mesh image and the volumetric mesh image such that corresponding portions of the planar depictions, the voxel mesh image, and the volumetric mesh image are associated with one another;
    converting the two-dimensional images into two-dimensional image textures; and
    manipulating the two-dimensional image textures into master material.

2. The method of claim 1, wherein the planar depictions comprise a stack of two-dimensional textures.

3. The method of claim 1, in which the step of creating planar depictions comprises uploading two-dimensional images and converting the two-dimensional images into manipulatable formats, the manipulatable formats comprising either texture or mesh.

4. The method of claim 3, further comprising maintaining a relationship between the two-dimensional image locations and the created planar depictions and mesh.

5. The method of claim 4, in which the maintained relationship between corresponding images allows user-selected images to highlight corresponding images.

6. The method of claim 1, in which the step of creating a voxel mesh comprises converting two-dimensional images into formats for manipulation.

7. The method of claim 6, further comprising converting the formats for manipulation into two-dimensional textures.

8. The method of claim 7, further comprising converting the two-dimensional textures into voxel mesh.

9. The method of claim 8, further comprising looping through each pixel of the two-dimensional textures and comparing the pixel values to user- or software-determined threshold values.

10. A method for creating three-dimensional mesh capable of evaluation and manipulation, comprising:
    uploading two-dimensional images for evaluation;
    creating planar depictions of the two-dimensional images;
    creating a voxel mesh image by pixel based on the two-dimensional images by converting the two-dimensional images into formats for manipulation, converting the formats for manipulation into two-dimensional textures, converting the two-dimensional textures into voxel mesh, and looping through each pixel of the two-dimensional textures and comparing the pixel values to user- or software-determined threshold values;
    creating a volumetric mesh image based on the two-dimensional images;
    displaying the planar depictions, the voxel mesh image, and the volumetric mesh image to a user in a virtual space;
    relating the planar depictions with the voxel mesh image and the volumetric mesh image such that corresponding portions of the planar depictions, the voxel mesh image, and the volumetric mesh image are associated with one another; and
    spawning voxels at the pixel locations as determined by the threshold values.

11. A method for creating three-dimensional mesh capable of evaluation and manipulation, comprising:
    uploading two-dimensional images for evaluation;
    creating planar depictions of the two-dimensional images;
    creating a voxel mesh image by pixel based on the two-dimensional images;
    creating a volumetric mesh image based on the two-dimensional images;
    displaying the planar depictions, the voxel mesh image, and the volumetric mesh image to a user in a virtual space;

relating the planar depictions with the voxel mesh image and the volumetric mesh image such that corresponding portions of the planar depictions, the voxel mesh image, and the volumetric mesh image are associated with one another; and manipulating master material into the volumetric mesh image using arbitrary rays projected into the volumetric mesh image from a virtual camera face.

\* \* \* \* \*